FIG. 4

United States Patent Office 2,841,762
Patented July 1, 1958

2,841,762

GASEOUS-DISCHARGE TUBE TESTER

Robert L. Bullard, Wappingers Falls, and Harry J. Beatty, Jr., Poughkeepsie, N. Y., assignors to International Business Machines Corporation, New York, N. Y., a corporation of New York Application July 6, 1956, Serial No. 596,254

14 Claims. (Cl. 324—23)

The present invention relates to tube testers and, more particularly, to a test system of flexible arrangement for ascertaining certain operating characteristics of tubes of the gaseous-discharge type.

It is found desirable in the fields of tube manufacturing, equipment maintenance, and equipment design and development that operating characteristics of vacuum tubes to be easily, rapidly and accurately determined by measurement. The measurement of several of the more important operating characteristics of the gaseous-discharge type of tube differs markedly from that of vacuum tubes of the highly evacuated type since the former exhibit the unique characteristic of rather abrupt change between their nonconductive and conductive states. This presents several problems regarding the precise measurement of the value of one or more critical operating voltages prevailing at the moment of change of the operating state of the tube under test, and these problems become more difficult when measurements are required to be made rapidly and accurately by relatively unskilled personnel.

It is an object of the present invention to provide a new and improved gaseous-discharge tube tester characterized by ease and rapidity of operation and high accuracy of measurement results.

It is a further object of the invention to provide a novel gaseous-discharge tube characteristic tester which enables all of the more important operating characteristics of such tubes to be rapidly ascertained with highly consistent accuracy by unskilled operating personnel.

It is an additional object of the invention to provide an improved gaseous-discharge tube characteristic tester in which any one of several of the more important operating characteristics thereof are selected for test simply by choice of one of several tube sockets in which the tube to be tested may be inserted and the test results automatically obtained merely by manual actuation of a test button, the results of the test being indicated immediately by meters which may be read at the leisure of the operator.

It is a particular object of the invention to ascertain whether gaseous-discharge devices of the "Thyratron" type have certain operating characteristics required for the generation of short-duration pulses of predetermined amplitude.

Other objects and advantages of the invention will appear as the detailed description thereof proceeds in the light of the drawings forming a part of this application and in which.

Figures 1, 6:
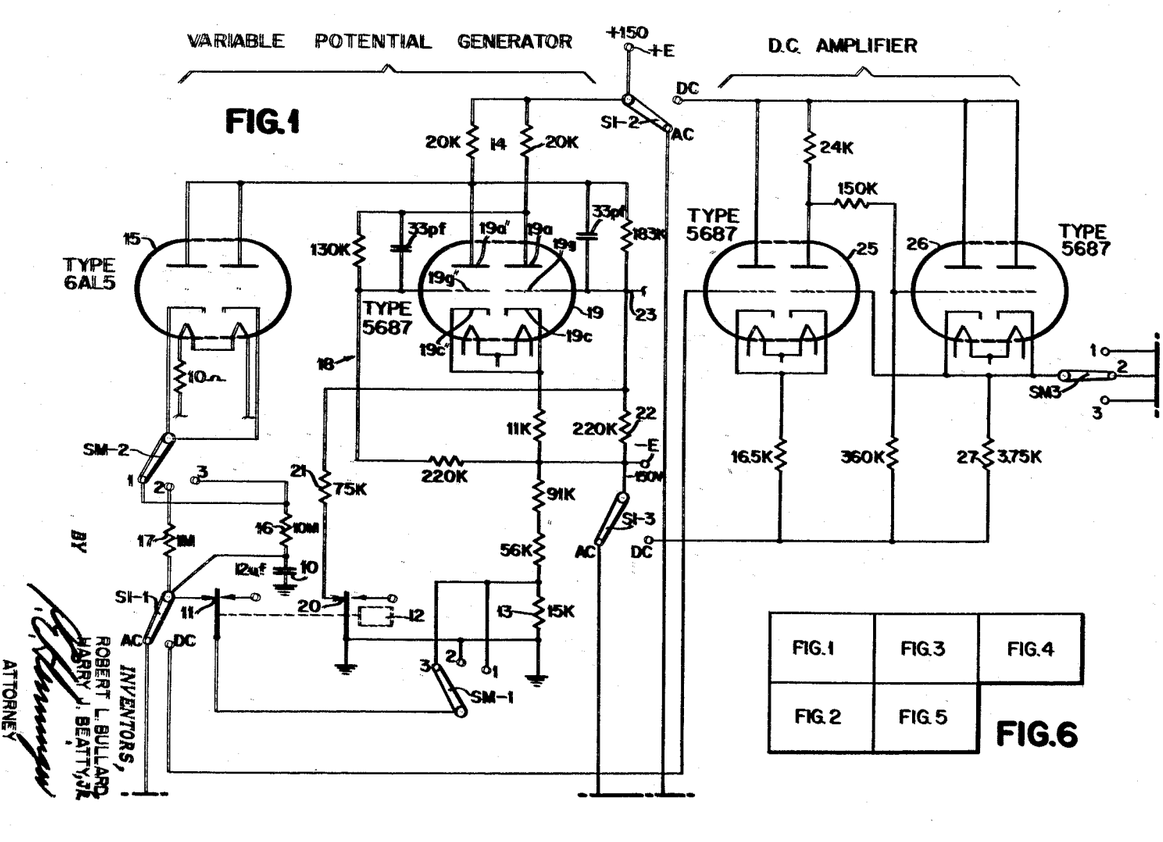
Figs. 1–5 represent the circuit diagram of a complete gaseous-discharge tube tester embodying the present invention.
Fig. 6 shows the manner in which these figures should be considered together as a unitary structure.
Figure 2:
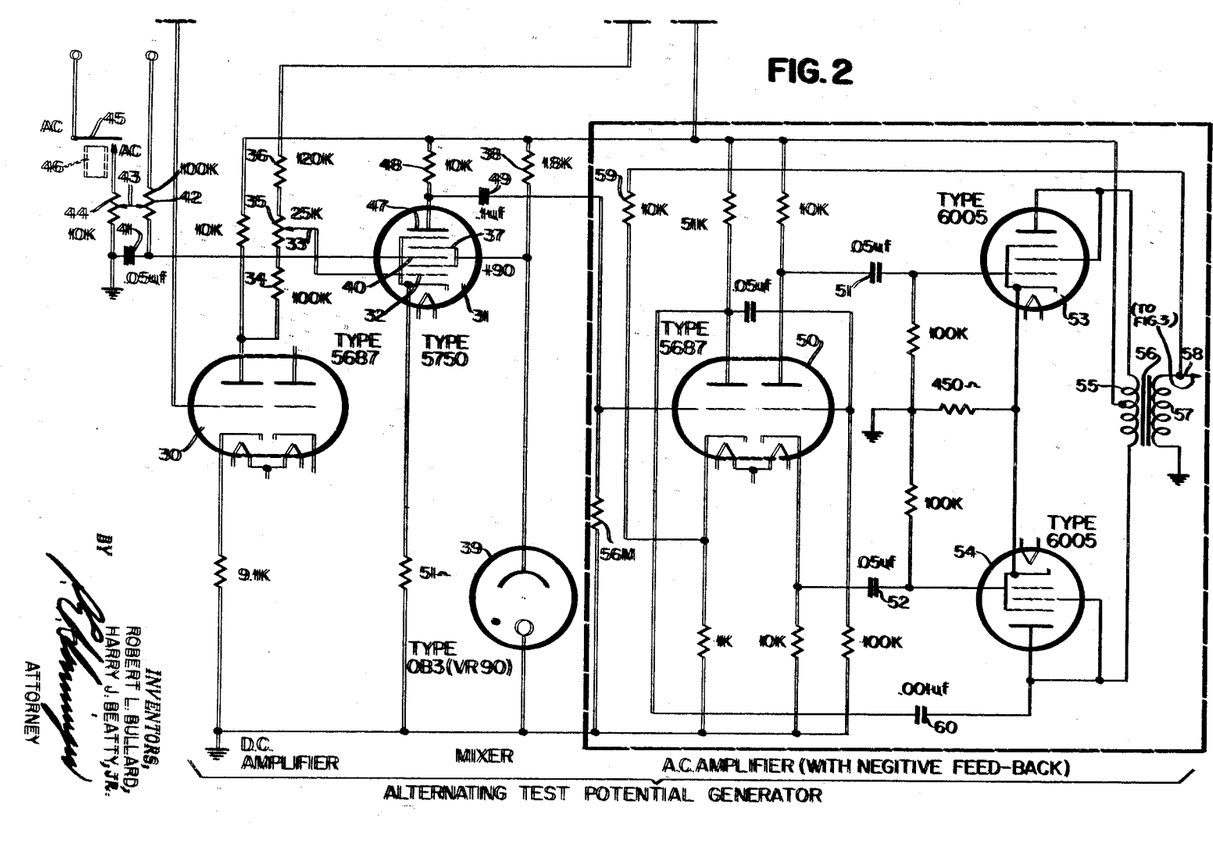
Figure 3:
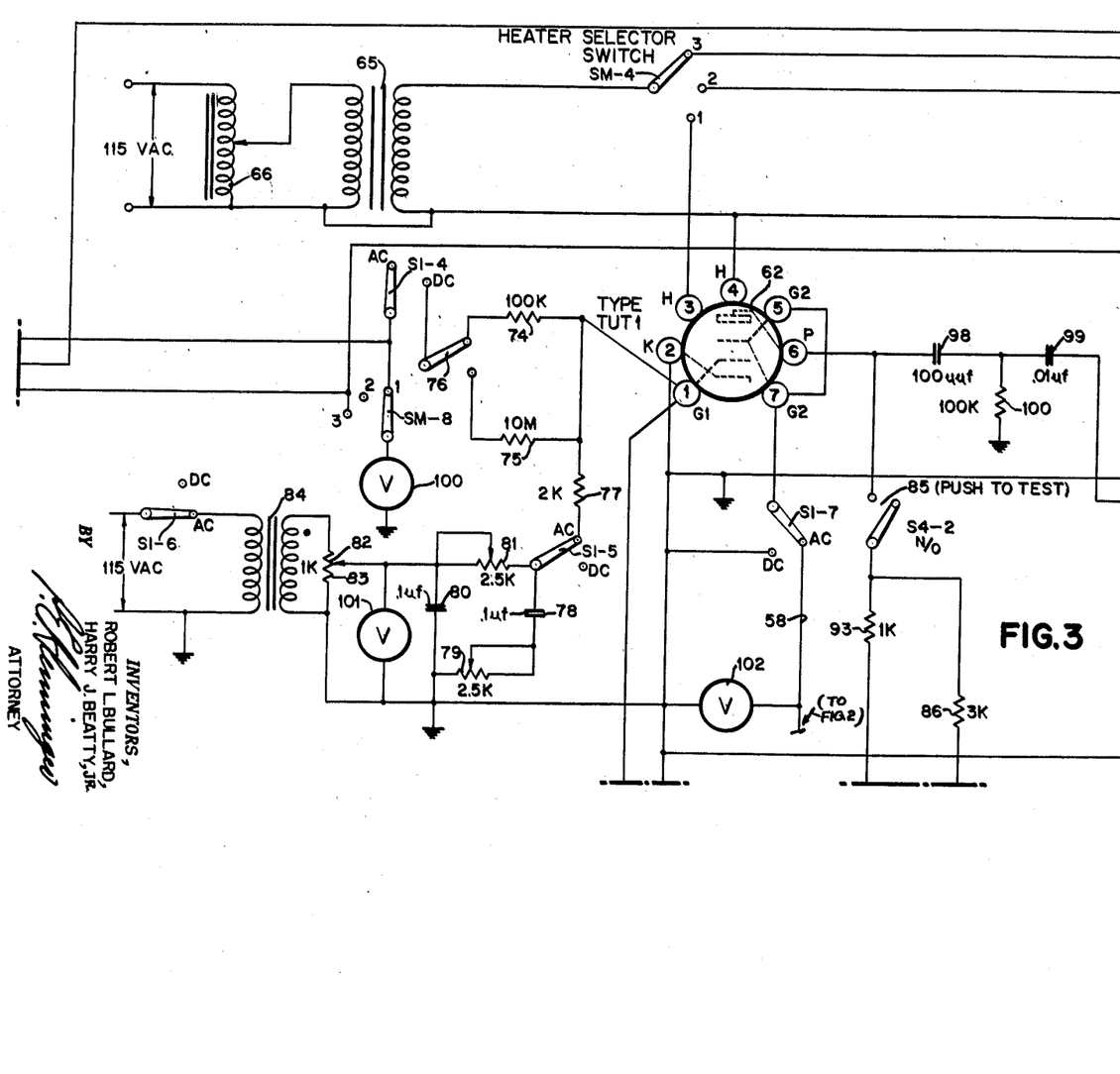
Figure 4:
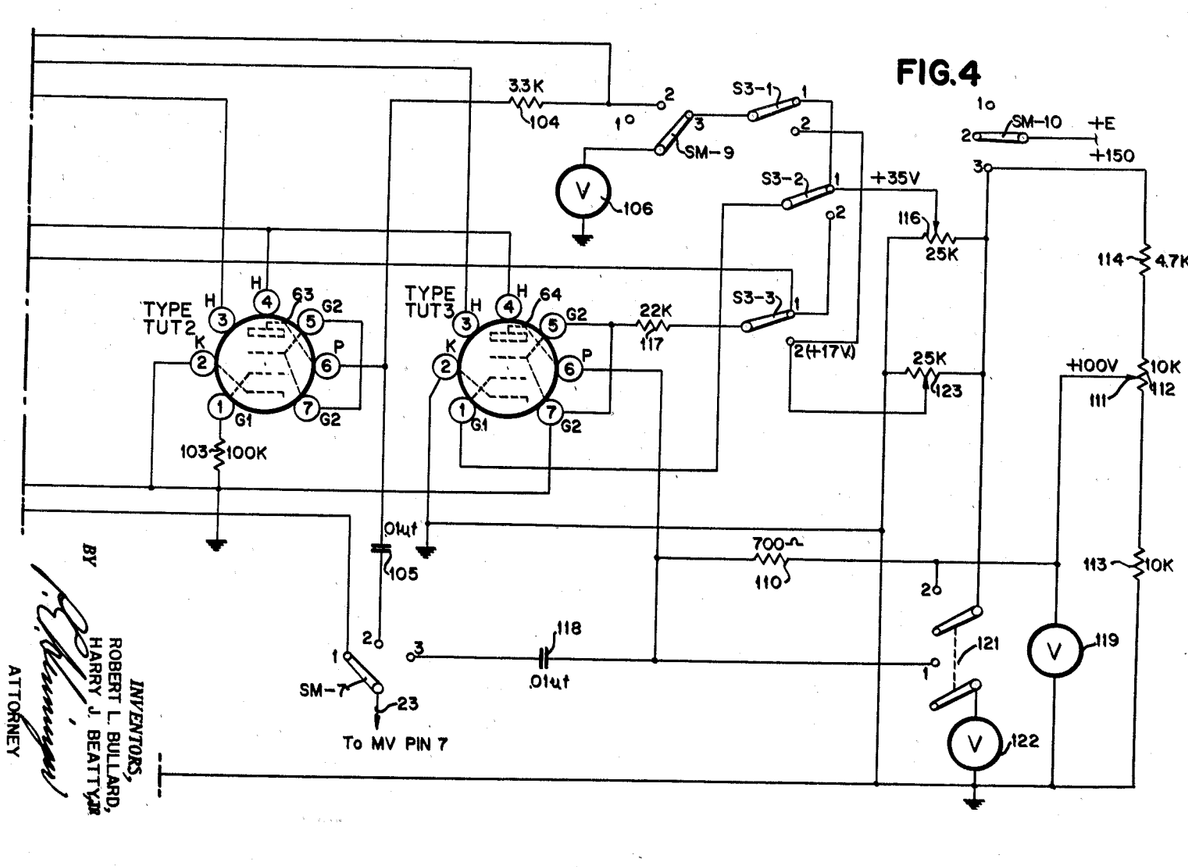
Figure 5:
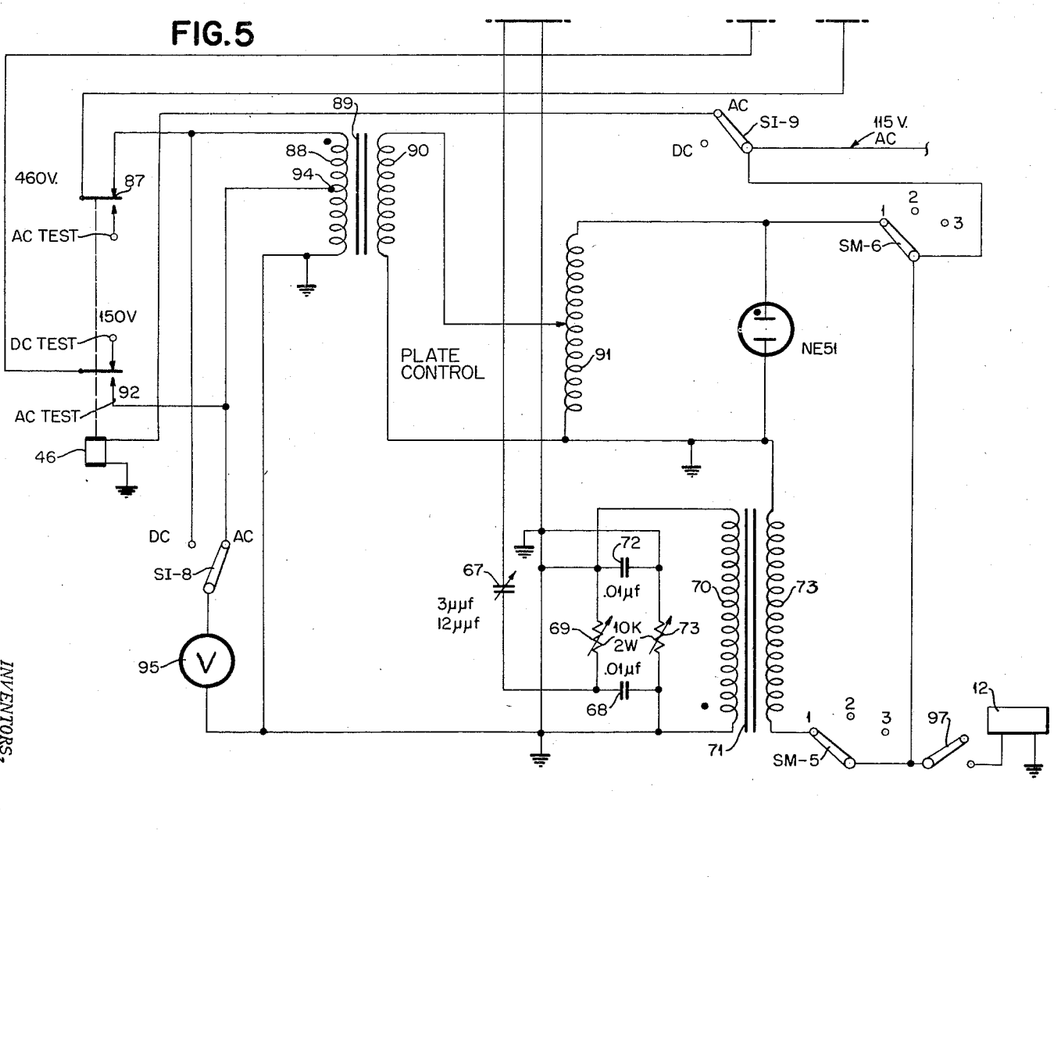

A tube tester embodying the persent invention is adapted to test the more important operating characteristics of gaseous-discharge tubes, a plurality of tube sockets being provided for selective insertion of the tube under test. When the tube is inserted in a first of these sockets, the tube cathode is connected to ground potential and selectably controlled values of in-phase alternating potential are applied to the control electrode and anode of the tube. The shield electrode then has applied to it an out-of-phase alternating test potential which decreases in value until the moment when the tube "fires" or becomes conductive, at which time this alternating potential remains constant in amplitude and may be measured as a measure of the A. C. control provided by the shield electrode over the A. C. operating characteristic of the tube. Provision is made also when the tube is inserted in this first test socket for making a test with a unidirectional test potential of variable amplitude applied to the control electrode. This test involves connecting the shield electrode to ground, impressing an alternating potential of selectable magnitude on the anode, and impressing upon the control electrode the variable-amplitude unidirectional test potential. The unidirectional component of the potential has increasing amplitude until the tube fires, at which moment the latter potential variation ceases and may be measured as an indication of the D. C. control provided by the control electrode over the A. C. operating characteristic of the tube.

The tube to be tested may also be placed in a second test socket wherein the control electrode, shield electrode and cathode of the tube are connected to ground potential. A unidirectional test potential of increasing amplitude is then applied to the anode of the tube until the tube fires or becomes conductive, at which time variation of the amplitude of the anode potential is immediately terminated and the value which it had at the moment of firing of the tube is read at the leisure of the operator to provide a measure of the anode D. C. firing characteristic of the tube.

By insertion of the tube in a third test socket, the anode is energized with a unidirectional potential of selectable value, the cathode is connected to ground, the control electrode is energized with a positive potential of selectable value, and the shield electrode is energized with a positive test potential which increases in amplitude until the tube fires at which moment the variation of this potential ceases and may be measured as a measure of the control provided by the shield electrode over the D. C. operation characteristic. Another test may be performed in this third test socket; the anode again is energized with unidirectional potential and the cathode is grounded, the shield electrode has impressed upon it a unidirectional positive potential of selectable value, and a unidirectional test potential of increasing amplitude is applied to the control electrode until the tube fires at which moment the variation of this potential ceases and may be measured as a measure of the control provided by the control electrode over the D. C. operating characteristic of the tube under test.

To set up the several test circuit arrangements of the tube tester to accomplish the tests last described, a ganged ten-section three-position switch (hereinafter designated as switch SM with sections 1–10, inclusive) is simply manually switched to one of three positions corresponding to the particular one of the three tube sockets selected for the test. This provides the proper circuit connections between a variable potential generator and one of two types of amplifiers by which to develop a test potential having a characteristic of variable amplitude appropriate for the test, and also provides the proper circuit connections by which this test potential is applied to an appropriate electrode of the tube under test. A second ten-section two-position switch (hereinafter designated as switch S1 with sections 1–10, inclusive) is manually switched to an A. C. or D. C. position depending upon whether the desired test essentially involves the measurement of a predominantly alternating potential or unidirectional potential operating characteristic of the tube under test.

The variable potential generator just mentioned includes a condenser 10 having a predetermined initial value of charge, and thus an initial value of terminal potential, established by the position of a switch SM–1 which connects the condenser through normally closed contacts 11 of a relay 12 either to ground potential in potential No. 2 of the switch SM–1 or across a resistor 13 in positions 1 and 3 of the switch SM–1. During the interval of generation of the variable amplitude test potential, the condenser 10 is given an increasingly larger charge from a source of potential, indicated as +E, through a resistor 14, a diode rectifier 15, and either a resistor 16 selected in positions Nos. 1 and 3 of a switch SM–2 or a resistor 17 in position No. 2 of the latter switch. It will be appreciated that the selection of the resistor 16 or 17 is for the purpose of establishing with the condenser 10 an appropriate charging time constant by which to provide an appropriate rate of increase of the terminal potential of the condenser 10 during the test interval.

The final value of charge of the condenser 10, and thus its final terminal potential, is under control of a bistable multivibrator 18 of conventional circuit arrangement having a vacuum tube 19 of the dual triode form with its electrodes interconnected in conventional manner as a conventional bistable multivibrator of the cathode coupled type. In this, the triode elements 19c, 19g, and 19a comprise a triode tube energized from the source +E and having its control electrode 19g so coupled to ground potential through a pair of contacts 20 of the relay 12 and a resistor 21 as to cause this triode section to be normally conductive before and during the test interval. It may be mentioned that the relay 12 is energized to initiate a test operation, and upon opening its contacts 20 causes the electrode 19g of the tube 19 to be so rebiased through a resistor 22 from a source of potential —E that this triode section of the tube 19 may be readily rendered nonconductive by a negative potential applied to the control electrode 19g through a conductor 23 at the termination of the test in a manner later to be described. When this triode section of the tube 19 is thus rendered nonconductive, the second triode section 19c′, 19g′ and 19a′ is rendered conductive by conventional multivibrator action. The anode 19a′ of this triode section is energized from the potential source +E through the resistor 14 functioning as an anode load resistor, and this triode section of the tube 19 when thus rendered conductive produces a sufficiently large potential drop across the resistor 14 as effectively to remove the potential source +E from the charging circuit of the condenser 10. That is, the potential drop developed across the resistor 14 by the space current of this triode section of the tube 19 in its conductive state decreases the potential applied between the anode of the rectifier 15 and ground to a value less than the terminal potential of the condenser 10 so that the rectifier 15 is rendered nonconductive. As long as the test relay 12 remains energized to maintain its contacts 11 open circuited, the final value of terminal potential of the condenser 10 remains constant since the condenser 10 is not able to discharge through the rectifier 15 due to the unidirectional conductive characteristic of the latter and there is no other discharge path provided for the condenser 10 until such time as the relay contacts 11 are permitted to close again by deenergization of the test relay 12.

Closure of the relay contacts 11 permits the condenser 10 to discharge either directly or through the resistor 13, depending upon the position of the switch SM–1, to its initial pre-test value of charge in readiness for a subsequent test operation.

The unidirectional potential of variable amplitude developed during the test interval across the condenser 10 in the manner just described is applied through a switch S1–1 either to a direct current amplifier or to an alternating potential test signal generator according to the manual positioning of the switch S1–1 in its A. C. or D. C. position depending upon whether the desired test essentially involves the measurement of a predominantly alternating potential or unidirectional potential operating characteristic of the tube under test.

In the D. C. position of the switch S1–1, the potential of the condenser 10 is applied to the input of a direct current amplifier. The latter is comprised by a vacuum tube 25 of the dual triode form having its first set of triode electrodes included in a conventional cathode follower type of amplifier arrangement and cathode-input coupled to the second triode section of the tube 25 with the latter section operating as a conventional anode-loaded amplifier direct coupled to a conventional cathode follower comprised by a triode form of tube 26. The tube 26 has a cathode resistor 27 across which is developed and applied to the movable switch element of a switch SM–3 a unidirectional test potential having increasing amplitude during the test interval. The anode electrodes of the tubes 25 and 26 are energized from the potential source +E through a switch S1–2 in its D. C. position, and the cathodes of these tubes are coupled to the potential source —E through a switch S1–3 in its D. C. position. It is apparent that this direct current amplifier is energized to develop a unidirectional test potential at the switch SM–3 only during tests of a unidirectional potential operating characteristic of the tube under test when the switches S1–2 and S1–3 are manually positioned to their D. C. positions.

In the A. C. position of the switch S1–1, the variable potential developed across the condenser 10 is applied to the alternating test potential generator earlier mentioned and which includes an input amplifier tube 30 of conventional arrangement direct coupled through a potential divider 33—36 to the input electrodes of a modulator or mixer tube 31. The latter is of the pentode type and includes a control electrode 32 connected to the adjustable tap 33 of the potential divider last mentioned. It may be noted that this potential divider is comprised by series resistors 34, 35 and 36, which not only couple the output circuit of the amplifier tube 30 to the control electrode 32 but also applies a suitable operating bias to the control electrode from the source of potential —E through the switch S1–3 in its A. C. position. The modulator tube 31 includes a screen electrode 37 energized through a resistor 38 and the switch S1–2 in its A. C. position from the source of potential +E, the voltage impressed upon the screen electrode 37 being stabilized by a voltage regulator tube 39. The modulator tube 31 also includes a modulator grid 40 which is coupled through a phase adjuster, comprised by a shunt condenser 41 and series adjustable resistor 42, to the adjustable tap 43 of a potential divider 44. The latter is energized through contacts 45 of a control relay 46, upon energization of the relay, from a source of alternating potential, not shown.

The modulator tube 31 further includes an anode 47 which is energized through a load resistor 48 from the potential source +E and is coupled through a condenser 49 to the input electrodes of an alternating current amplifier of conventional arrangement. This amplifier includes a vacuum tube 50 having a first triode section included in a conventional amplifier arrangement, the output electrodes of this section being coupled to the input electrodes of a second triode section of the tube 50 having electrodes included in a conventional phase inverter arrangement. The latter provides two phase opposed output circuits coupled through condensers 51 and 52 to a push-pull amplifier stage including vacuum tubes 53 and 54. The anode load impedance of the latter vacuum tubes is comprised by the primary winding 55 of an output transformer 56 having a secondary winding 57 connected at one end to ground and connected at its opposite end to an output circuit 58 in which is developed the alternating test potential. The amplifier last described includes two conventional degenerative feed back paths to linearize and stabilize the amplifier characteristics in well known manner, one such path coupling the potential developed in the output circuit 58 through a resistor 59 to the cathode circuit of the amplifier stage comprised by the first triode section of the tube 50 whereas the second feed back path applies the potential developed in the output circuit of the vacuum tube 54 through a condenser 60 to the output circuit of the amplifier stage last mentioned.

Considering at this point the operation of the alternating test potential generator just described, the unidirectional potential of positive increasing amplitude developed across the condenser 10 is amplified and inverted by the amplifier stage 30 and is applied as a potential of negatively increasing amplitude to the control electrode 32 of the modulator tube 31. The alternating potential of amplitude controlled by adjustment of the tap 43 on the potential divider 44, and of phase controlled by adjustment of the resistor 42, is applied to the modulator electrode 40 of the modulator tube 31. There is accordingly developed in the output circuit of the modulator stage an alternating potential which decreases in amplitude during the test interval in corresponding manner to the increase of amplitude of the potential developed across the condenser 10 during this interval. This varying amplitude alternating potential is amplified by the amplifier and inverter stage 50 and is further amplified by the push-pull amplifier stage 53, 54 to develop in the output circuit 58 an alternating test potential of amplitude which decreases during the test interval. It will be apparent that this alternating test potential has an amplitude controlled by, but varying in opposite sense to, the unidirectional potential developed across the condenser 10.

It was mentioned above that the tube tester includes three tube sockets into which the tube to be tested may be inserted for purposes of test. These are sockets 62, 63 and 64 which have their heater terminals (Nos. 3 and 4) connectable through individual contacts Nos. 1, 2 and 3 of the switch section SM-4 to a low voltage transformer 65 energized through an adjustable auto-transformer 66, by which to control the magnitude of the voltage applied to the heater electrodes of the tube under test, from a source of alternating potential, not shown.

The cathode socket terminal No. 2 of the socket 62 is connected to ground potential. The control electrode socket terminal No. 1 of this socket is connected through a condenser 67 to a phasing and "noise" filter network used for a purpose presently to be explained. This network is comprised by a condenser 68 connected in series with an adjustable resistor 69 across a secondary winding 70 of a transformer 71 and also by a condenser 72 connected in series with an adjustable resistor 73 across the secondary winding 70 as shown. The condenser 67 is connected to the juncture of the condenser 68 and resistor 69, while the juncture of the condenser 72 and resistor 73 is connected to ground. The transformer 71 includes a primary winding 73 which is connected through switch sections SM-5 and SM-6 in their No. 1 positions across a source of alternating potential, not shown. The control electrode terminal No. 1 of the socket 62 is also connected through a resistor 74 or a resistor 75, depending upon the selective positioning of a switch 76, and a switch section S1-4 in its D. C. position and the switch section SM-3 in its No. 1 position to the output circuit of the direct current amplifier previously described. This No. 1 control electrode terminal of the socket 62 is also connected through a resistor 77 and a switch section S1-5 in its alternating current position to a phasing network energized with alternating potential. This phasing network includes a condenser 78 in series with an adjustable resistor 79 and a condenser 80 in series with an adjustable resistor 81 connected as shown between the switch section S1-5 and an adjustable tap 82 of a potentiometer 83 connected across the secondary winding of a transformer 84 energized by a switch section S1-6 in its A. C. position from a source of alternating current, not shown.

The shield electrode terminals Nos. 5 and 7 of the socket 62 are connected by a switch section S1-7 in its D. C. position to ground or in its A. C. position to the output circuit 58 of the alternating test potential generator earlier described. The anode terminal No. 6 of the socket No. 2 is connected through a manually actuable push-button "test" switch 85, a resistor 86, and the normally closed contacts 87 of the relay 46 to the high potential terminal of the secondary winding 88 of a transformer 89 having a primary winding 90 connected through an adjustable auto-transformer 91 to a source of alternating potential, not shown. A normally open pair of contacts 92 of the relay 46 may alternately connect anode terminal No. 6 of the socket 62 through the push-button switch 85 and a resistor 93 to a tap terminal 94 of the transformer secondary winding 88. A switch section S1-8 in its D. C. position applies the full voltage of the transformer secondary winding 88 to a voltmeter 95 for measurement, and this switch in its A. C. position connects the voltmeter 95 to the tap terminal 94 of the winding 88. The anode terminal No. 6 of the socket 62 is also coupled through a high-pass filter, comprising series condensers 98 and 99 and a shunt resistor 100, and a switch section SM-7 in its No. 1 position to the input circuit 23 of the multivibrator included in the variable potential generator described above.

A switch section S1-9 in its A. C. position energizes the relay 46 from the same source of alternating potential which energizes the auto-transformer 91. A switch 97, mechanically connected for unicontrolled operation with the manual push-button test switch 85, energizes the relay 12 through the switch section SM-6 in its No. 1 position from the same source of alternating potential which energizes the transformer 91.

Consider now the test operations effected by inserting a gaseous-discharge tube in the socket 62 for test and by manually actuating the switch SM with its switch sections 1-7 to its No. 1 position. As previously noted, the several switch sections of the switch SM serve to establish upon energization of relay 12 through the switch 97 a predetermined initial potential and predetermined charging time constant for the condenser 10 of the variable potential generator, to connect the output of the D. C. amplifier to the switch S1-4 where it is available to be applied during a D. C. test to the control electrode of the tube under test, to apply appropriate heater voltage to the tube under test, to energize the transformer 71, and to couple the output circuit of the tube under test to the multivibrator of the variable potential generator. A D. C. test of the tube inserted in the socket 62 is effected by manually actuating the S1 switch with its switch sections 1-9, inclusive, to its D. C. position. This applies the test potential of the condenser 10 to the D. C. amplifier, energizes the latter for operation, applies the output voltage of the D. C. amplifier through one of the grid-current limiting resistors 74 and 75 selected according to the position of switch 76 for reasons presently to be explained, to the control electrode of the tube under test, and connects the shield electrode of the tube under test to ground. The switch S1-8 in the D. C. position connects the voltmeter 95 across the entire secondary winding 88 of the transformer 89, and the auto-transformer 91 is adjusted at this time to provide the desired value of anode potential to be applied to the tube under test.

Now upon manual closure of the push-button test switch 85, 97, the anode test potential is applied to the anode of the tube under test and the relay 12 is energized to open its normally closed contacts 11 and 20 thereby initiating the development of the variable unidirectional test potential across the condenser 10 and conditioning the multivibrator 19 for operation to its second bistable state. The unidirectional potential thereupon developed across the condenser 10 is amplified by the direct current amplifier comprising tubes 25 and 26, and the amplified potential developed across the cathode resistor 27 of the latter tube is applied through the switch section SM–3 in its No. 1 position and the switch section S1–4 in its D. C. position and the switch 76 to the control electrode of the tube under test. There is also concurrently applied to the control electrode of the tube an out-of-phase (with relation the anode potential) alternating current potential supplied from the secondary winding 70 of the transformer 71 through the noise control and phasing network 67—69, 72 and 73. It is the purpose of this potential to neutralize an undesired stray "noise" alternating potential which is in one manner or another picked up and impressed on the control electrode. As the unidirectional potential increases in amplitude, a point is ultimately reached where the tube under test becomes conductive and its anode potential suddenly decreases in amplitude due to the voltage drop developed across the anode load resistor 86. This decrease of anode potential is effectively differentiated by the high-pass filter 98—100 and is applied through the switch section SM–7 in its No. 1 position and the conductor 23 to the control electrode 19g of the tube 19 to render this triode section nonconductive and the triode section 19a′, 19g′ and 19c′ conductive by multivibrator action. The resulting anode current flowing through the anode resistor 14 decreases the positive potential applied to the diode rectifier 15 to a value below that of its cathode potential as determined by the potential of charge of the condenser 10. This renders the diode rectifier 15 nonconductive and thereupon terminates any further charge of the condenser 10 which, being devoid at this time of any discharge circuit, remains at its maximum charge potential.

This maximum charge potential after amplification by the direct current amplifier 25, 26 appears at the switch S1–4 and its value is measured by a voltmeter 100 as a measure of the control-electrode action on the firing characteristic of the tube under test. Reading the value of this measured test potential may be done at the leisure of the operator, and the push-button test switch 85, 97 is then manually released both to remove the anode potential from the tube under test and also to deenergize the relay 12. The relay 12 in deenergized position closes its contacts 11 to discharge the condenser 10 through the resistor 13 to condition the condenser for a subsequent test, and the relay contacts 20 close to restore the multivibrator 19 to its initial bistable state where its triode section 19a, 19g and 19c is conductive. The other triode section 19a′, 19g′ and 19c′ of the multivibrator is now nonconductive and the full potential of the source +E is applied to the diode rectifier 15 in readiness again to charge the condenser 10 for a subsequent test operation. The foregoing test is initially made with the switch 76 moved to the position where the resistor 74 is in circuit, and is then repeated with the switch 76 moved to include the much larger valued resistor 75 in circuit. Any excessive control electrode emission now produces such an appreciable potential drop across the resistor 75 as to provide an appreciably changed value of steady-state bias of the control electrode, so that such excessive emission is evidenced by a significant change of the firing level of the tube under test as the switch 76 inserts first the resistor 74 and then the resistor 75 in the control electrode circuit.

The alternating current test of a tube in the socket 62 is effected by operating the switch S1 to its alternating current position. The switch section S1–1 applies the test potential developed across the condenser 10 to the direct-current amplifier tube 30, the switch section S–2 energizes the direct current amplifier 30, the mixer 31, and the alternating current amplifier 50, 53 and 54 for operation, and the switch section S1–3 establishes a bias circuit for the control electrode 32 of the mixer tube 31 through the potential divider comprised by the resistors 34 and 36 of the potentiometer 35. The switch section S1–5 and switch section S1–6 now apply to the control electrode of the tube under test an alternating potential of value determined by adjustment of the potentiometer 83, as measured by a voltmeter 101, and of such phase established by adjustment of the resistors 79 and 81 as to be in phase with the voltage applied to the anode of the tube. The switch section S1–7 applies to the shield electrode of the tube under test the output test voltage developed in the alternating current amplifier output circuit 58. The switch section S1–9 energizes the relay 46 to open the relay contacts 87 and close the relay contacts 92 so that the voltage at the tap point 94 of the transformer 89 is now connected through the anode load resistor 93 to the anode of the tube upon manual closure of the push-button test switch 85, 97. As before, the magnitude of this anode potential is adjusted by adjustment of the auto-transformer 91 and its value is measured through the switch section S1–8 by the voltmeter 95.

This tube test is again initiated by manual closure of the test switch 85, 97 to apply alternating potential to the anode of the tube under test and to energize the relay 12 which opens its contacts 11 to initiate charge of the condenser 10 and opens its contacts 20 to condition the multivibrator 19 for operation. The unidirectional potential developed across the condenser 10 is translated by the amplifier 30, the mixer 31, and the amplifier 50, 53, 54 to develop in the output circuit 58 as previously explained the controlled amplitude alternating test potential. This alternating test potential is 180° out of phase with the anode and the control-electrode voltages and is applied through the switch section S1–7 (in its A. C. position) to the shield electrode of the tube under test. As this test potential decreases in amplitude, in correspondence with the increase in amplitude of the unidirectional potential developed across the condenser 10, a point is reached where the tube under test in the socket 62 becomes conductive and its anode potential sharply decreases due to the potential drop developed across the anode resistor 93. This decrease of anode potential is integrated by the high-pass filter 98—100 and is applied through the switch section SM–7 and the conductor 23 to the multivibrator 19 to change the latter to its second bistable state and thereby bias the rectifier device 15 to its nonconductive state due to the potential drop produced across the anode resistor 14. As before, this terminates further charge of the condenser 10 and its terminal potential remains constant thereafter since there is no discharge path for the condenser. As a consequence the test potential which was applied through the amplifier output circuit 58 to the shield electrode of the tube under test also remains constant in amplitude at the amplitude value which caused the tube under test to be rendered conductive, and this value of test potential is indicated by a voltmeter 102 connected across the output circuit 58 as a measure of the control of the shield electrode over the operating characteristics of the tube under test. The reading of the voltmeter 102 may be made at the convenience of the operator, and thereafter the manual test switch 85, 97 is released once more to discharge the condenser 10 and restore the multivibrator 19 to its initial test condition as previously explained.

Upon insertion of the tube to be tested in the socket 63, a test may be made for the value of unidirectional anode potential which causes the tube to become conductive. In this test, the cathode and shield electrode of the tube under test are connected to ground and the control electrode is connected through a resistor 103 to ground. For this test, the switch SM is manually operated to its No. 2 position and the switch S1 is manually operated to its D. C. position. The function of the switch S1 in its D. C. position has already been explained, and it may be mentioned that movement of the switch SM to its No. 2 position removes all charge from the condenser 10 by grounding the latter through the normally closed contacts 11 of the relay 12 so that the test starts with zero terminal potential of this condenser. The switch section SM-2 places the resistor 17 in the charging circuit of the condenser 10 and thus provides a new and different rate of charge of the condenser 10 for this test. The switch section SM-3 applies the output potential of the direct current amplifier 25, 26 through and anode load resistor 104 to the anode of the tube under test, and variations of anode potential of the tube under test are applied through a condenser 105 and the switch sections SM-7 to the conductor 23 which is connected to the control electrode 19g of the multivibrator 19. The switch section SM-6 energizes the relay 12 upon initiation of test effected by manual closure of the push-button test switch 85 (which contacts performs no function in this test) and 97. As before, the unidirectional potential of varying amplitude developed across the condenser 10 is amplified by the direct current amplifier 25 and 26 and is applied through the switch section SM-3 and the anode load resistor 104 to the anode of the tube under test. As this test potential increases in amplitude, a point is reached where the tube under test becomes conductive and its anode potential drops sharply due to the potential drop developed across the anode resistor 104. The potential at which this state of conductivity occurred is indicated by a voltmeter 106 which is connected through a switch SM-9 to the output circuit of the direct current amplifier, and the drop of anode potential is applied through the condenser 105 and the switch section SM-7 to the multivibrator to change the latter to its second bistable state earlier described where the diode rectifier 15 is rendered nonconductive and the charging of the condenser 10 terminates. Release of the manual push-button test switch 85, 97 after the operator has read the voltmeter 106 at his leisure, deenergizes the relay 12 to restore the test system to its initial condition in a manner earlier described.

A tube may be inserted in a socket 64 to test the manner in which the tube becomes conductive for selected values of unidirectional potential applied to its control electrode and anode accompanied by varying values of unidirectional potential applied to its shield electrode or, conversely, for the condition of selected values of unidirectional potential applied to its anode and shield electrode accompanied by varying values of unidirectional potential applied to its control electrode. For these tests, the cathode of the tube under test is connected to ground and its anode is connected through an anode load resistor 110 to the adjustable contact 111 of a potentiometer 112 which is connected in series with a resistor 113 and a resistor 114 and through a switch section SM-10 (in position No. 3) across a source of unidirectional potential, indicated as +E.

The two tests mentioned as being available for a tube inserted in the socket 64 are selected by manual positioning of a triple-pole double-throw switch S3. In position No. 1 of the latter switch, the control electrode of the tube under test has applied thereto through a current limiting resistor 120 a selectable value of fixed unidirectional potential derived from a voltage divider 116 connected across the potential source +E, the voltmeter 106 being connected through the switch section SM-9 in its No. 3 position and the section of the switch R3-1 to measure the adjusted value of this control electrode potential. The shield electrode for this test is connected through a current limiting resistor 117 and the switch section S3-3 and the switch section SM-3 in its position No. 3 to the output circuit of the direct current amplifier so that there is applied to the shield electrode the unidirectional test voltage of variable amplitude. In this regard, the switch section SM-3 in its No. 3 position connects the voltmeter 100 across the output circuit of the direct current amplifier to measure the steady magnitude of the test voltage after the tube under test has become conductive. The anode of the tube under test is coupled hrough a condenser 118 and the switch section SM-7 in its No. 3 position and the conductor 23 to the input circuit of the multivibrator to change the bistable state of the latter at the moment the tube under test becomes conductive and its anode potential drops due to the potential drop thereupon developed across the anode load resistor 110. The voltmeter 119 measures the value of unidirectional anode potential applied to the tube under test, as determined by the adjusted position of the contact 111 on the potentiometer 112. The current limiting resistor 120, included in series with the control electrode of the tube under test, limits the control electrode current during the conductive state of the tube. Thus this test of the tube is one where the control electrode and anode potentials have fixed values and the variable unidirectional test potential is applied to the shield electrode, the variable test potential increasing in value following initiation of test by manual actuation of the push-button test switch 85, 97 to develop the variable amplitude test potential as earlier explained. At the moment the tube under test becomes conductive, the bistable state of the multivibrator is changed by the decrease of anode potential of the tube tested and this terminates further variation of amplitude of the test potential, the amplitude of the latter at the conclusion of the test being read from the voltmeter 100 at the convenience of the operator who thereafter releases the manual push-button switches 85, 97 to restore the system to its initial condition in readiness for a subsequent test operation. This test provides a measure of the shield-electrode firing characteristic of the tube under test.

Upon manual actuation of the switch S3 to its No. 2 position, the shield electrode is supplied with a selected value of unidirectional potential from a potentiometer 123, connected across the potential source +E, the value of this potential being measured by the voltmeter 106 now connected through the switch section SM-9 and switch section S3-1 to the potential divider 123. The switch section S3-2 now applies the variable amplitude test potential to the control electrode of the tube under test to ascertain the control-electrode firing characteristic of the tube under test, the resulting test operation being evident from the foregoing description.

A switch 121 may be manually closed after the tube has gone into full conductivity in either of the foregoing described tests and this applies the full +E voltage through the anode-current limiting resistor 110 to the anode of the tube and permits the "tube drop" voltage to be read by a voltmeter 122.

While specific forms of the invention have been described for purposes of illustration, it is contemplated that numerous changes may be made without departing from the spirit of the invention.

What is claimed is:

1. A gaseous-discharge tube characteristic tester comprising, an energy storage device, impedance means providing with said device a value of time constant determining the rate of any change of energy storage in said device, energy translating means including said storage device and said impedance means and including a first energy control device for establishing an initial value of energy storage in said storage device and a second energy control device for establishing a final value of energy storage in said storage device, means for actuating said first control device to initiate a change of energy storage in said storage device, means for utilizing the energy storage of said storage device for applying to a preselected electrode of a gaseous-discharge tube to be tested a test-control potential having a characteristic varying with time and in a sense tending to render said tube conductive, and means responsive to the attainment of gaseous-discharge conduction by said tube for actuating said second control device to establish said final value of energy storage in said storage device and thereby provide a measure of a preselected operating characteristic of said tube.

2. A gaseous-discharge tube characteristic tester comprising, a condenser, resistive means providing with said condenser a value of time constant determining the rate of any change of charge of said condenser, energy translating means including said condenser and resistive means and including a first charge control device for establishing an initial value of charge in said condenser and a second charge control device for establishing a final value of charge in said condenser, means for actuating said first control device to initiate a change of charge in said condenser, means for utilizing the charge of said condenser for applying to a preselected electrode of a gaseous-discharge tube to be tested a test-control potential having a characteristic varying with time and in a sense tending to render said tube conductive, and means responsive to the attainment of gaseous-discharge conduction by said tube for actuating said second control device to establish said final value of charge in said condenser and thereby provide a measure of a preselected operating characteristic of said tube.

3. A gaseous-discharge tube characteristic tester comprising, a condenser, a source of unidirectional potential, resistive means coupling said condenser to said potential source and providing with said condenser a value of time constant determining the rate of any change of charge of said condenser, a first charge control device for establishing an initial value of charge in said condenser, a second charge control device for establishing a final value of charge in said condenser, means for actuating said first control device to initiate a change of charge in said condenser, means for utilizing the charge of said condenser for applying to a preselected electrode of a gaseous-discharge tube to be tested a test-control potential having a characteristic varying with time and in a sense tending to render said tube conductive, and means responsive to the attainment of gaseous-discharge conduction by said tube for actuating said second control device to establish said final value of charge in said condenser and thereby provide a measure of a preselected operating characteristic of said tube.

4. A gaseous-discharge tube characteristic tester comprising, a condenser, a source of unidirectional potential, resistive means coupling said condenser to said potential source and providing with said condenser a value of time constant determining the rate of any change of charge of said condenser, a first charge control device for establishing an initial value of charge in said condenser, means including a second charge control device for establishing a final value of charge of said condenser by effectively removing said potential from said condenser, means for actuating said first control device to initiate a change of charge in said condenser, means for utilizing the charge of said condenser for applying to a preselected electrode of a gaseous-discharge tube to be tested a test-control potential having a characteristic varying with time and in a sense tending to render said tube conductive, and means responsive to the attainment of gaseous-discharge conduction by said tube for actuating said second control device to establish said final value of charge in said condenser and thereby provide a measure of a preselected operating characteristic of said tube.

5. A gaseous-discharge tube characteristic tester comprising, a condenser, a source of unidirectional potential, resistive means coupling said condenser to said potential source in a charge-modifying circuit having a preselected time constant determining the rate of any change of charge of said condenser, a unidirectional conductive device included in said circuit and polarized to permit a change of charge of said condenser from an initial value to a final value, a first charge control device for establishing said initial value of charge in said condenser, a second charge control device for controlling the final value of unidirectional potential applied from said source through said unidirectional conductive device to said condenser and thereby establish said final value of charge of said condenser, means for actuating said first control device to initiate a change of charge in said condenser, means for utilizing the charge of said condenser for applying to a preselected electrode of a gaseous-discharge tube to be tested a test-control potential having a characteristic varying with time and in a sense tending to render said tube conductive, and means responsive to the attainment of gaseous-discharge conduction by said tube for actuating said second control device to establish said final value of charge in said condenser and thereby provide a measure of a preselected operating characteristic of said tube.

6. A gaseous-discharge tube characteristic tester comprising, a condenser, a source of unidirectional potential, resistive means coupling said condenser to said potential source in a charge-modifying circuit having a preselected time constant determining the rate of any change of charge of said condenser, a unidirectional conductive device included in said circuit and polarized to permit a change of charge of said condenser form an initial value to a final value, a first charge control device for establishing said initial value of charge in said condenser, a second charge control device coupled to said condenser through said unidirectional conductive device for controlling said final value of charge of said condenser by effectively decreasing the value of the potential of said source below the potential of charge of said condenser and thereby render said unidirectional device nonconductive to maintain said final charge in said condenser, means for actuating said first control device to initiate a change of charge in said condenser, means for utilizing the charge of said condenser for applying to a preselected electrode of a gaseous-discharge tube to be tested a test-control potential having a characteristic varying with time and in a sense tending to render said tube conductive, and means responsive to the attainment of gaseous-discharge conduction by said tube for actuating said second control device to establish said final value of charge in said condenser and thereby provide a measure of a preselected operating characteristic of said tube.

7. A gaseous-discharge tube characteristic tester comprising, a condenser, a source of unidirectional potential, resistive means coupling said condenser to said potential source and providing with said condenser a value of time constant determining the rate of any change of charge of said condenser, a first charge control device for establishing an initial value of charge in said condenser, means including a second conductance-control device characterized by high rate of change between its conductive and nonconductive states for establishing a final value of charge of said condenser by rapid change of the value of potential applied from said source to said condenser, means for actuating said first control device to initiate a change of charge in said condenser, means for utilizing the charge of said condenser for applying to a preselected electrode of a gaseous-discharge tube to be tested a test-control potential having a characteristic varying with time and in a sense tending to render said tube conductive, and means responsive to the attainment of gaseous-discharge conduction by said tube for actuating said second control device to establish said final value of charge in said condenser and thereby provide a measure of a preselected operating characteristic of said tube.

8. A gaseous-discharge tube characteristic tester comprising, a condenser, a source of unidirectional potential, resistive means coupling said condenser to said potential source and providing with said condenser a value of time constant determining the rate of any change of charge of said condenser, a first charge control device for establishing an initial value of charge in said condenser, means including a bistable multivibrator for controlling the potential applied from said source to said condenser to establish a final value of charge in said condenser, means for actuating said first control device to initiate a change of charge in said condenser, means for utilizing the charge of said condenser for applying to a preselected electrode of a gaseous-discharge tube to be tested a test-control potential having a characteristic varying with time and in a sense tending to render said tube conductive, and means responsive to the attainment of gaseous-discharge conduction by said tube for controlling said multi-vibrator to establish said final value of charge in said condenser and thereby provide a measure of a preselected operating characteristic of said tube.

9. A gaseous-discharge tube characteristic tester comprising, a condenser, a source of unidirectional potential, resistive means coupling said condenser to said potential source in a charge-modifying circuit having a preselected time constant determining the rate of any change of charge of said condenser, a unidirectional conductive device included in said circuit and polarized to permit a change of charge of said condenser from an initial value to a final value, a first charge control device for establishing said initial value of charge in said condenser, a bistable multivibrator for controlling the final value of unidirectional potential applied from said source through said unidirectional conductive device to said condenser and thereby establish said final value of charge of said condenser, means for actuating said first control device to initiate a change of charge in said condenser, means for utilizing the charge of said condenser for applying to a preselected electrode of a gaseous-discharge tube to be tested a test-control potential having a characteristic varying with time and in a sense tending to render said tube conductive, and means responsive to the attainment of gaseous-discharge conduction by said tube for controlling said multivibrator to establish said final value of charge in said condenser and thereby provide a measure of preselected operating characteristic of said tube.

10. A gaseous-discharge tube characteristic tester comprising, a condenser, a source of unidirectional potential, resistive means coupling said condenser to said potential source in a charge-modifying circuit having a preselected time constant determining the rate of any change of charge of said condenser, a unidirectional conductive device included in said circuit and polarized to permit a change of charge of said condenser from an initial value to a final value, a first charge control device for establishing said initial value of charge in said condenser, a bistable multivibrator including a resistor positioned in said charge-modifying circuit between said unidirectional conductive device and said source to supply in a preselected operating condition of said multivibrator energizing current from said source to said multivibrator and thereby establish said final value of charge of said condenser, means for actuating said first control device to initiate a change of charge in said condenser, means for utilizing the charge of said condenser for applying to a preselected electrode of a gaseous-discharge tube to be tested a test-control potential having a characteristic varying with time and in a sense tending to render said tube conductive, and means responsive to the attainment of gaseous-discharge conduction by said tube for controlling said multivibrator to establish said preselected operating condition thereof and thereby provide by measure of said final value of charge of said condenser a measure of a preselected operating characteristic of said tube.

11. A gaseous-discharge tube characteristic tester comprising, an energy storage device, impedance means providing with said device a value of time constant determining the rate of any change of energy storage in said device, energy translating means including said storage device and said impedance means and including a first energy control device for establishing an initial value of energy storage in said storage device, means for actuating said first control device to initiate a change of energy storage in said storage device, means responsive to the energy storage of said storage device for deriving and applying to a preselected electrode of a gaseous-discharge device to be tested an alternating test-control potential having an amplitude varying with time and in a sense tending to render said tube conducting, and means responsive to the attainment of gaseous-discharge conduction by said tube for actuating said second control device to establish said final value of energy storage in said storage device and thereby provide a final constant amplitude value of test-control potential indicative of a preselected operating characteristic of said tube.

12. A gaseous-discharge tube characteristic tester comprising, an energy storage device, impedance means providing with said device a value of time constant determining the rate of any change of energy storage in said device, energy translating means including said storage device and said impedance means and including a first energy control device for establishing an initial value of energy storage in said storage device and a second energy control device for establishing a final value of energy storage in said storage device, means for actuating said first control device to initiate a change of energy storage in said storage device, means for utilizing the energy storage of said storage device for applying to a preselected electrode of a gaseous-discharge device to be tested a test-control potential having an alternating-potential component of fixed amplitude and a unidirectional-potential component of amplitude varying with time and in a sense tending to render said tube conductive, and means responsive to the attainment of gaseous-discharge conduction by said tube for actuating said second control device to establish said final value of energy storage in said storage device and thereby provide a final constant amplitude value of said unidirectional component of said test-control potential indicative of a preselected operating characteristic of said tube.

13. A gaseous-discharge tube characteristic tester comprising, an energy storage device, impedance means providing with said device a value of time constant determining the rate of any change of energy storage in said device, energy translating means including said storage device and said impedance means and including a first energy control device for establishing an initial value of energy storage in said storage device and a second energy control device for establishing a final value of energy storage in said storage device, means for actuating said first control device to initiate a change of energy storage in said storage device, means for applying to the anode and control electrode of a gaseous-discharge tube to be tested in-phase alternating potentials of preselected amplitudes, means for utilizing the energy storage of said storage device for applying to the shield electrode of said tube an alternating test-control potential having an amplitude decreasing with time and of a phase opposite to that of said control electrode and anode potentials, and means responsive to the attainment of gaseous-discharge conduction by said tube for actuating said second control device to establish said final value of energy storage in said storage device and thereby provide a final constant amplitude value of test-control potential indicative of a preselected operating characteristic of said tube.

14. A gaseous-discharge tube characteristic tester comprising, an energy storage device impedance means providing with said device a value of time constant determining the rate of any change of energy storage in said device, energy translating means including said storage device and said impedance means and including a first energy control device for establishing an initial value of energy storage in said storage device and a second energy control device for establishing a final value of energy storage in said storage device, means for actuating said first control device to initiate a change of energy storage in said storage device, a source of alternating potential, means including an amplitude modulation device coupled to said source and responsive to the energy storage of said storage device for deriving and applying to a preselected electrode of a gaseous-discharge device to be tested an alternating test-control potential having an amplitude varying with time and in a sense tending to render said tube conducting, and means responsive to the attainment of gaseous-discharge conduction by said tube for actuating said second control device to establish said final value of energy storage in said storage device and thereby provide a final constant amplitude value of test-control potential indicative of a preselected operating characteristic of said tube.

References Cited in the file of this patent

UNITED STATES PATENTS

| | | |
|---|---|---|
| 2,088,317 | Bachelet | July 27, 1937 |
| 2,485,924 | Sanders | Oct. 25, 1949 |
| 2,544,685 | Jackson | Mar. 13, 1951 |
| 2,761,104 | Morris | Aug. 28, 1956 |